April 21, 1964 H. R. IRONS 3,130,320

BINARY COUNTER USING CORES, TRANSISTORS AND DIODES

Filed Aug. 19, 1959 3 Sheets-Sheet 1

INVENTOR.
HENRY R. IRONS

BY Q. Baxter Warner
O. E. Hodges
ATTORNEYS.

April 21, 1964 H. R. IRONS 3,130,320

BINARY COUNTER USING CORES, TRANSISTORS AND DIODES

Filed Aug. 19, 1959 3 Sheets-Sheet 2

INPUT STAGE FOR COUNTER

HYSTERESIS LOOP OF CORE

INVENTOR.
HENRY R. IRONS

BY

ATTORNEYS

April 21, 1964 H. R. IRONS 3,130,320

BINARY COUNTER USING CORES, TRANSISTORS AND DIODES

Filed Aug. 19, 1959 3 Sheets-Sheet 3

INVENTOR.
HENRY R. IRONS
BY
W. O. Quesenberry
O. Hodges
ATTYS.

United States Patent Office 3,130,320

Patented Apr. 21, 1964

3,130,320

BINARY COUNTER USING CORES, TRANSISTORS AND DIODES

Henry R. Irons, Washington, D.C., assignor to the United States of America as represented by the Secretary of the Navy Filed Aug. 19, 1959, Ser. No. 834,902
9 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

This invention relates to an improved binary counter circuit for digital computers utilizing transistors as regenerative amplifiers.

A binary counter may be defined as a circuit which rseponds to two successive input pulses of the same polarity to produce a single output pulse. Therefore, each output pulse records a pair of input pulses. More specifically a binary counter consists of transistors and cores connected in such a manner that the count is indicated in binary form by the positive and negative residual magnetism on the core. The transistors are used as regenerative amplifiers to change the state of the cores when an input pulse is applied to the counter.

A binary counter using another method is described in my copending application Serial No. 829,473, now U.S. Patent No. 3,077,543. In this copending application the charge is stored on the capacitors during the time the flux on the core is being switched from $-B_r$ state to the $+B_{max}$ state by the input current $I_{in}$. This capacitor charge prevents the transistors $T_1$ from being triggered by the transient that occurs in the core winding when current $I_{in}$ terminates. A second application of the input produces only a small change in flux (from $+B_r$ to $+B_{max}$) and hence no appreciable voltage on the capacitors. When this current terminates, the transient in regenerative windings cause the transistor to conduct, and by regenerative action to switch the flux in the core from $+B_r$ to $-B_{max}$. The parameters in the above circuit reduce and delay the voltage that is applied to the base of the transistor by the regenerative winding and hence delays the triggering of the circuit. In addition, when the current switches the flux in the core, a large positive voltage is developed on the base of the transistor which may cause a voltage breakdown from the base to the the collector, or from the base to the emitter in the case of a diffused base transmitter, which is undesirable.

Applicant's present invention has overcome these disadvantanges thereby greatly enhancing the reliability of his device.

It is the object of this invention to provide a binary counter with a magnetic memory device capable of retaining the impression of the last received signal.

Another object of the present invention is to provide circuits of the type herein described employing transistors.

It is a further object of this invention that the transistors in these circuits are used as regenerative amplifiers to change the magnetic state of the magnetic device.

It is another object of this invention to provide a binary counter circuit requiring very little power but capable of reliable counting at a high rate of speed.

It is still anotoher object of this invention to provide an output pulse that is controlled by the saturation flux density of the core rather than the transistor parameters.

The foregoing and other objects of this invention, with the advantages and novel features thereof, as well as the invention itself both as to its organization and mode of operation may be best understood from the following description when read in connection with the accompanying drawings in which like reference numerals refer to similar parts, and in which:

FIG. 1 is a schematic circuit diagram of the binary counter, in which transistors are employed as regenerative amplifiers;

FIG. 2 discloses the output current pulse wave form from stage *n* and the voltage wave form induced in the circuit as seen by point $V_b$ of FIG. 1;

Figure 1:
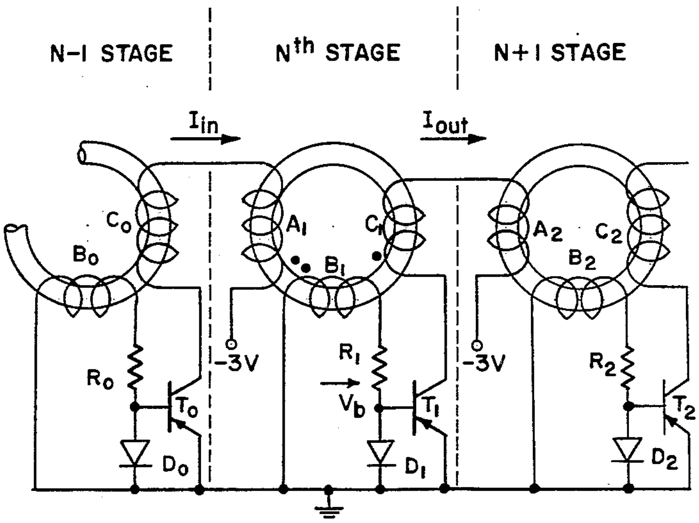
Figure 2:
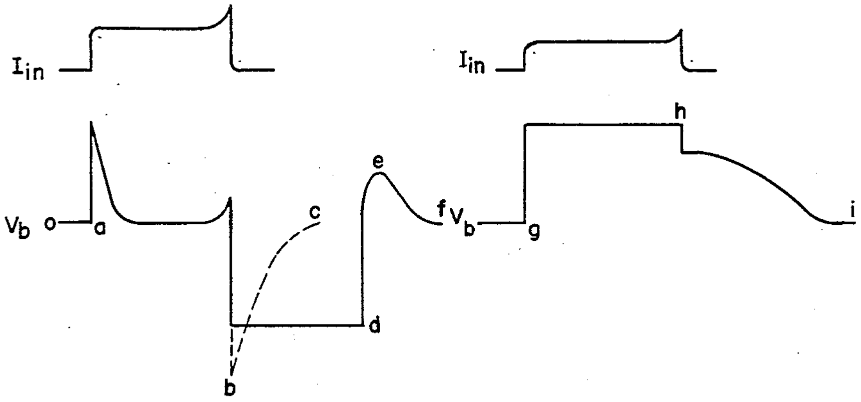
Figure 3:
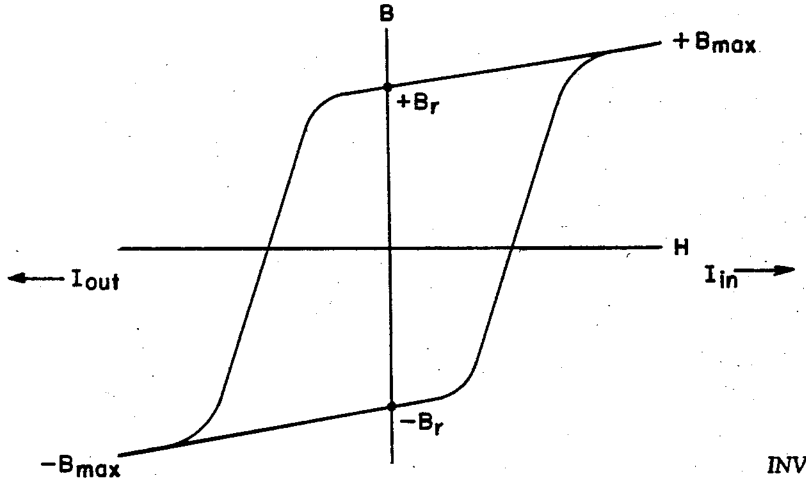
FIG. 3 is an idealized graph of the hysteresis characteristics of the magnetic core that may be employed in the circuit of FIG. 1.

A single stage of the binary counter comprises a permalloy core having a rectangular hysteresis loop as shown in FIG. 3, a transistor $T_1$, a silicon diode $D_1$ and a resistor $R_1$. All the component parts being arranged as shown in FIG. 1. Each stage of the counter is essentially a blocking oscillator that is triggered by alternate current pulses from the previous stage. For example, output current pulse from stage $N-1$ (as shown in FIG. 1) will trigger stage N when the core of stage N is in the $+B_r$ state, but will not trigger this stage if the core is in the $-B_r$ state. In detail, if core N of stage N is in the $+B_r$ state, the current pulse from the previous stage will cause a core flux to be shifted or changed along the path $+B_r$ to $+B_{max}$ and thence to $+B_r$, as shown in FIG. 3, and will produce the voltage *a—b*, as shown in FIG. 2. The voltage at point *b* is sufficiently negative to trigger the transistor in stage N. The regenerative action of the transistor and core produces the wave form *b—d—e—f* as the flux and the core changes from $+B_r$ to $-B_{max}$ to $-B_r$. The next current pulse from stage $N-1$ will change the state of the core from $-B_r$ to $+B_{max}$ and in so doing will produce a positive voltage in winding B of sufficient duration to produce a large minority carrier storage in the diode. This carrier storage persists long enough to prevent the negative voltage in winding B (due to the turn-off of the current pulse from the previous stage) from triggering the transistor, as can be seen by voltage curve *g—h—i* FIG. 2. The alternate outputs of stage N will trigger the stage $N+1$ in a similar manner.

The duration of the input pulse to the N stage can be adjusted so that it is of only sufficient duration to saturate the core of this stage. This can be accomplished by selecting the proper number of turns for the output windings of core $N-1$.

Figure 4:
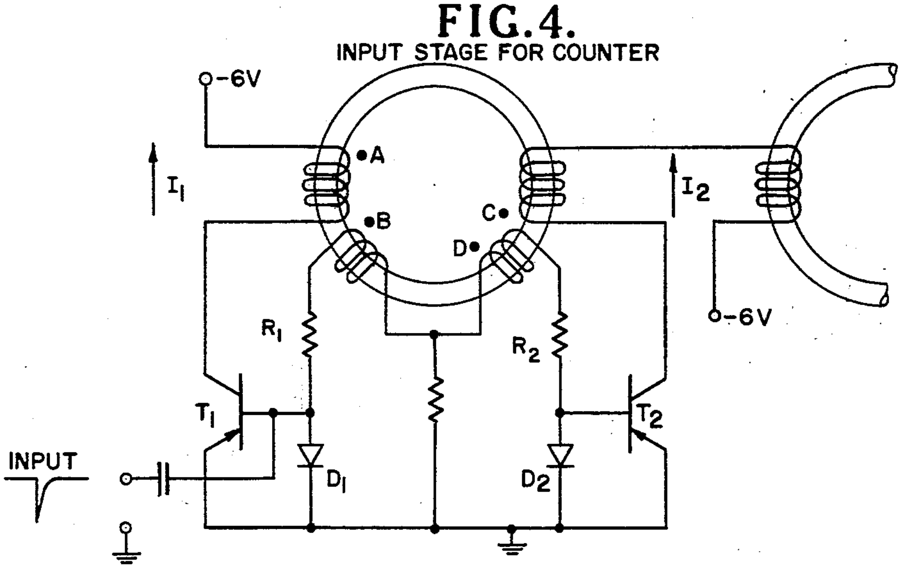
FIG. 4 is a schematic circuit diagram of a simple complementing flip-flop circuit capable of being used in an accumulator type adder circuit or other digital applications.
Figure 5:
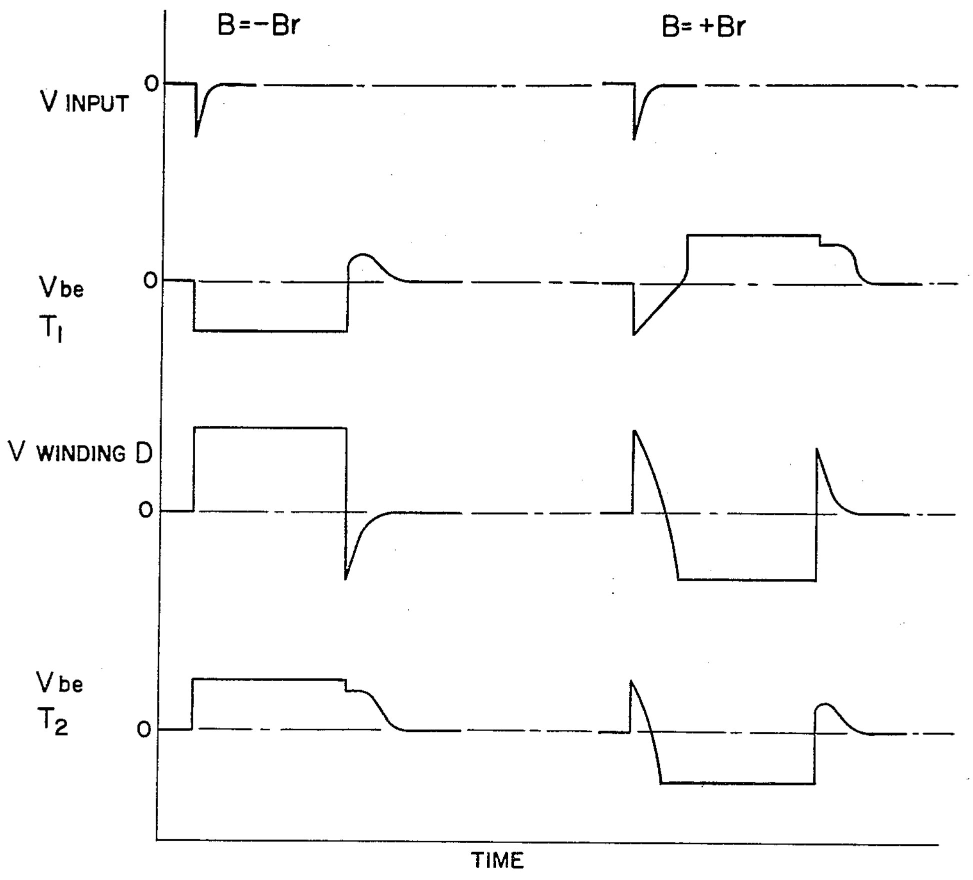
FIG. 5 discloses the voltage waveform of transistors $T_1$, $T_2$ and winding D of the circuit of FIG. 4.

An input current pulse of proper duration to operate the first stage of the counter could be obtained from a conventional blocking oscillator such, for example, as that described in my copending application supra. However, the circuit shown in FIG. 4 has two advantages that make it superior to the blocking oscillator. These advantages are, the circuit performs as a binary counter stage and the duration of the output pulse is controlled by the saturation flux density of the core rather than the transistors' parameters. FIG. 5 discloses the voltages appearing on the base to emitter of transistors $T_1$, $T_2$ and on winding $D_1$ after the signal is received and the core is in either the $-B_r$ or $+B_r$ state, as shown in the circuit of FIG. 4. The $V_{input}$ of FIG. 5 represents the voltage waveform of the triggering signal pulse received by the core in each of the two magnetic stable states. To describe the operation of the circuit, let it be assumed, by way of example, that the core is in the $-B_r$ state and that the current $I_1$ due to the input pulse is in such a direction as to change the core in a direction of $+B_{max}$ as shown in FIG. 3. The regenerative action of a transistor and core will cause the current $I_1$ to continue to flow until the core is saturated at $+B_m$. The base current of transistor $T_1$ flowing through the diode $D_2$, FIG. 4, will produce sufficient hole storage in the diode to prevent the triggering of transistor $T_2$ by the regenerative turnoff of current $I_1$, thus leaving the core in the $+B_r$ state. The current $I_1$ due to the next input signal will cause the flux to change from $+B_r$ to $+B_{max}$ in such a short time (approximately 0.1 microsecond) that no appreciable hole storage will be developed in diode $D_2$. When the current $I_1$ stops flowing and the transistor $T_2$ will be triggered, due to the negative voltage on the base of the transistor, this will result in a change of flux in the core from $+B_r$ to $-B_{max}$. The hole storage of diode $D_1$, as is well known in the art, will prevent the triggering of the transistors $T_1$ by the voltage developed by the collapse of field around the windings when current $I_2$ stops flowing.

If winding C of FIG. 4 is connected to a −6 volt supply rather than to the next core, a simple complementing flip-flop circuit is obtained which can be used in an accumulator type adder circuit or other such digital applications.

The circuits described herein are capable of high counting rates and yet require very little power at low counting rates. For example, a five stage binary counter has a total power consumption of 40 microwatts when operated at a counting rate of 100 pulses per second. Counting rates as high as $2\times10^6$ per second have been obtained with commercially available cores. Good reliability is indicated by the fact that the circuit of FIG. 1 has been successfully operated over a temperature range of −65° F. to +160° F. with a supply voltage of −2.0 volts to −4.5 volts.

As can be readily seen by a person skilled in the art, this method permits the use of diffused transistors which are capable of providing maximum operating speed. The diodes (by taking advantage of the hole effect) prevent the triggering of the circuit when this is desired and permits rapid triggering when needed.

Other obvious modifications of applicant's device would be to place a parallel R-C circuit in the emitter circuit of the transistor to limit the collector current in the transistor to a safe value. If desired, a slight positive voltage may be used on the base of each of the transistors to prevent triggering by spurious voltages.

While there has been shown and described certain preferred embodiments of the invention, other modifications thereof will readily occur to those skilled in the art and it is intended therefore, that the invention be limited only by the appending claims.

What is claimed as new and desired to be secured by Letters Patent of the United States is:

1. In a binary counter device comprising a saturable toroidal core capable of being shifted selectively to a first and second stable state of flux saturation, triggering means for shifting the flux in the closed magnetic circuit from said first stable state to the second stable state, said triggering means including a trigger winding on said core, means for causing an input signal to flow through the trigger winding, said signal being of such magnitude as to drive the core flux into the second stable state, a regenerative amplifier means responsive to the change of flux in said core caused by a second input signal in said trigger winding for shifting the flux in the said saturable core from the second stable state to the first stable state, said regenerative amplifier means comprising a pair of windings including an output winding mounted on the said core and a transistor having input, output and control electrodes, said control and output electrodes each connected to a respective one of said pair of windings, a diode connected between the control and input electrodes of said transistor, said diode capable of maintaining said transistor biased beyond cutoff for a predetermined time when said core is being driven into said second stable state due to hole storage effects in said diode caused by current flow in said diode when said core is being driven into said second stable state.

2. In a binary counter device comprising a plurality of saturable toroidal core elements, the flux of each element of said plurality of core elements capable of being shifted selectively to a first and second stable state of flux saturation, a first core element of said plurality of core elements, triggering means including a winding on said core element for shifting flux in closed magnetic circuit of said core from said first stable state to the second stable state thereof, regenerative amplifier means for shifting the flux in the saturable core from the second stable state to the first stable state, said regenerative amplifier means comprising a diode, a transistor and a pair of windings including an output winding mounted on said core, said transistor having the base thereof electrically connected to said diode and the collector of said transistor electrically connected to said output winding in such manner that the hole storage in the diode biases the transistor base to cut off and prevents a regenerative amplifier action thereby providing a binary counting action.

3. In the input stage of a binary counter comprising the combination of a saturable toroidal core element capable of being selectively shifted to a first and second stable state of flux saturation, triggering means including an input winding and a first regenerative winding responsive to a first input signal for shifting the flux of the saturable core element from said first stable state to the second stable state, said triggering means comprising a diode, a transistor and said input and first regenerative windings mounted on said saturable core, said transistor having input, output and control electrodes, said control and output electrodes each connected to a respective one of said input winding and said first regenerative winding, said diode connected between the control and input electrodes of said transistor, said diode capable of maintaining said transistor beyond cutoff for a predetermined time when said core is being driven into the first stable state due to hole storage effects in the diode, a second regenerative amplifier means responsive to the change of flux in the core caused by a second input signal for shifting the flux of the saturable core from the second stable state to the first stable state, said second regenerative amplifier means comprising a pair of windings including an output winding and a second regenerative winding all mounted on the said saturable core, a second transistor having input, output and control electrodes, said control and output electrodes each connected to a respective one of said pair of windings, a second diode connected between the control and input electrodes of said second transistor and capable of maintaining said second transistor beyond cutoff for a predetermined time when said core is being driven into said second stable state due to hole storage effects in said second diode.

4. In a binary circuit comprising at least one magnetic element being capable of being selectively shifted to one of two stable states of flux saturation, separate input and output windings linked to said element, said input winding being responsive to impulse signals, an intermediate winding linked to said element, a diode, a transistor, said intermediate winding being electrically connected to said diode and transistor and to the said output winding, the diode being of the type characterized by having a low forward resistance and a low back resistance for a period of time subsequent to passage of forward current therethrough and having a high back resistance in absence of said forward current, said diode being connected directly between a control terminal and an input terminal of said transistor to bias the base of the transistor slightly positive after the first impulse signal has been applied to said input winding thereby causing the transistor not to fire, said diode connection permitting the transistor base to swing negative after the second signal impulse has been applied to said input winding thereby triggering the transistor and energizing said output winding.

5. A binary counter according to claim 4 including a second magnetic element having an input winding thereon connected to said output winding and energized thereby.

6. A binary counter according to claim 5 including means for negatively biasing said last named input and output windings.

7. A binary counter capable of counting a series of pulses comprising a plurality signal responsive stages, each stage of said plurality of stages including a saturable core capable of being selectively stabilized in either a first stable state or a second stable state, input means connected to one of the saturable cores for generating sufficient flux to change the core state when energized, an input signal energizing said input means and switching the core from the first stable state through a second unstable state to the second stable state, a second input signal energizing said input means switching the core from the second stable state to the second unstable state, the flux in said core decaying again to the second stable state, regenerative amplifier means connected to said core, said regenerative amplifier means including an intermediate winding and an output winding mounted on said core, a resistor and a diode of the minority carrier type connected in series between said intermediate winding and a common return, said diode connected in the forward direction to the common return, a transistor having the base connected between said resistor and diode with the collector electrically connected to said output winding and the emitter connected to the common return, said regenerative amplifier means being actuated by the decay of flux generated by said second input signal for shifting the core from the second stable state to the first stable state whereby the minority carriers of the diode normally maintain the transistor biased to cutoff except during decay of the flux generated by said second signal.

8. A binary counter capable of counting a plurality of signal pulses comprising a plurality of signal responsive stages, a first stage of said plurality of stages including a saturable core capable of being selectively shifted from a first stable state to a second stable state, an output winding, a first and second intermediate winding and an input winding separably mounted on said core, one end of each of said first and second intermediate windings being connected through a single impedance to a common return, a first resistor and a first diode in series respectively between the common return and the other end of said first intermediate winding, a second resistor and a second diode in series respectively between the common return and the other end of said second intermediate winding, a first transistor having a base, emitter and collector, said first transistor having the collector connected to said input winding, the base connected between said first resistor and the first diode and the emitter connected to the common return, input means connected to the base of said first transistor for actuating said transistor, a second transistor having a collector, emitter and base, said second transistor having the base connected between said second resistor and second diode, the collector connected to the output winding and the emitter connected to a common return, a second stage of said plurality of stages having means for receiving a signal from said output winding.

9. A binary counter capable of counting a plurality of signal pulses comprising a plurality of signal responsive stages, a first stage of said plurality of stages including a saturable core, a first regenerative transistor circuit means connected to said core for generating sufficient flux to drive said core from a first stable state to a second stable state when actuated, input means connected to said first circuit means for supplying the actuating signals thereto, a diode of the type having a large minority carrier storage connected in said first transistor circuit means for normally maintaining said circuit means in an off condition except when actuated by said input means, a second regenerative transistor circuit means connected to said core for generating sufficient flux to drive the core from the second stable state to the first stable state when actuated, a diode of the type having a large minority carrier storage located in said second transistor circuit means for normally maintaining said second circuit means in an off condition, said second circuit means actuated to an on condition by a voltage generated by the decay of flux created by the alternate actuating signals.

References Cited in the file of this patent

UNITED STATES PATENTS

| | | |
|---|---|---|
| 2,866,178 | Lo et al. | Dec. 23, 1958 |
| 2,902,609 | Ostroff et al. | Sept. 1, 1959 |
| 2,911,626 | Jones et al. | Nov. 3, 1959 |
| 2,912,681 | Paull | Nov. 10, 1959 |
| 2,913,708 | Paull | Nov. 17, 1959 |
| 2,955,211 | Ostroff | Oct. 4, 1960 |
| 2,963,688 | Amemiya | Dec. 6, 1960 |

OTHER REFERENCES

"Multiple Pulse Prevention in Magnetic Counter," by Winthrop S. Pike, RCA Technical Notes, published by RCA, RCA Labs., Princeton, N.J., RCA TN No. 52 (1957).